(12) United States Patent
Ahn et al.

(10) Patent No.: US 8,531,997 B2
(45) Date of Patent: Sep. 10, 2013

(54) METHOD OF PERFORMING HYBRID AUTOMATIC REPEAT REQUEST (HARQ) IN WIRELESS COMMUNICATION SYSTEM

(75) Inventors: Joon Kui Ahn, Anyang-si (KR); Daewon Lee, Anyang-si (KR); Young Woo Yun, Anyang-si (KR); Ki Jun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 66 days.

(21) Appl. No.: 13/096,946

(22) Filed: Apr. 28, 2011

(65) Prior Publication Data

US 2011/0261729 A1    Oct. 27, 2011

Related U.S. Application Data

(63) Continuation of application No. 12/670,613, filed as application No. PCT/KR2009/001270 on Mar. 13, 2009, now Pat. No. 7,957,329.

(60) Provisional application No. 61/036,987, filed on Mar. 16, 2008, provisional application No. 61/040,132, filed on Mar. 27, 2008.

(51) Int. Cl.
*H04J 3/00* (2006.01)

(52) U.S. Cl.
USPC ............................... 370/280; 370/330

(58) Field of Classification Search
USPC ........................... 370/280, 236, 330
See application file for complete search history.

(56) References Cited

U.S. PATENT DOCUMENTS

| | | | |
|---|---|---|---|
| 7,509,554 B2 | 3/2009 | Lohr et al. | |
| 8,068,457 B2 * | 11/2011 | Pi et al. | 370/329 |
| 8,331,947 B2 * | 12/2012 | Kim et al. | 455/450 |

(Continued)

FOREIGN PATENT DOCUMENTS

| | | |
|---|---|---|
| CN | 1750451 A | 3/2006 |
| CN | 1914846 A | 2/2007 |

(Continued)

OTHER PUBLICATIONS

3GPP, 3rd Generation Partnership Project; Technical Specification Group Radio Access Network; Evolved Universal Terrestrial Radio Access (E-UTRA); Physical layer procedures (Release 8), 3GPP TS 36.213, V8.1.0, Nov. 2007, pp. 1-17.

(Continued)

*Primary Examiner* — Brian D Nguyen
(74) *Attorney, Agent, or Firm* — Birch, Stewart, Kolasch & Birch, LLP

(57) ABSTRACT

A method of performing hybrid automatic repeat request (HARQ) performed by a user equipment (UE) in a wireless communication system is provided. The method includes receiving downlink assignments in a first subframe, a downlink assignment being transmitted based on a control channel element (CCE), the CCE being a logically indexed resource unit, receiving downlink data on a downlink shared channel in the first subframe, the downlink shared channel being assigned according to the downlink assignments, generating ACK/NACK signals which indicate successful or unsuccessful reception of the downlink data, and transmitting in a second subframe, the ACK/NACK signals by using uplink resources of a subset, the subset being mapped to the first subframe, at least one of the uplink resources being mapped to a plurality of CCEs in the first subframe. Limited resources for uplink feedback are effectively used to support HARQ operation.

10 Claims, 10 Drawing Sheets

(56) References Cited

U.S. PATENT DOCUMENTS

| | | | |
|---|---|---|---|
| 2006/0062173 A1 | 3/2006 | Cheng et al. | |
| 2007/0201885 A1* | 8/2007 | Brown et al. | 399/21 |
| 2008/0095106 A1* | 4/2008 | Malladi et al. | 370/329 |
| 2008/0117891 A1* | 5/2008 | Damnjanovic et al. | 370/345 |
| 2008/0175195 A1* | 7/2008 | Cho et al. | 370/329 |
| 2008/0232307 A1* | 9/2008 | Pi et al. | 370/328 |
| 2008/0298224 A1 | 12/2008 | Pi et al. | |
| 2009/0046639 A1 | 2/2009 | Cai et al. | |
| 2009/0046788 A1 | 2/2009 | Kotecha | |
| 2009/0074090 A1 | 3/2009 | Xu et al. | |
| 2009/0109892 A1* | 4/2009 | Oyman et al. | 370/315 |
| 2009/0122736 A1* | 5/2009 | Damnjanovic et al. | 370/311 |
| 2009/0197542 A1* | 8/2009 | Buckley et al. | 455/70 |
| 2010/0182975 A1 | 7/2010 | Malladi et al. | |

FOREIGN PATENT DOCUMENTS

| | | |
|---|---|---|
| JP | 2006-87120 A | 3/2006 |
| KR | 10-2004-0107784 B1 | 2/2006 |
| KR | 10-2006-0067329 A | 6/2006 |
| KR | 10-2005-0087947 B1 | 10/2006 |
| KR | 10-2006-0131808 A | 12/2006 |
| KR | 10-2008-0003682 A | 1/2008 |
| WO | 2009/116754 A2 | 9/2009 |

OTHER PUBLICATIONS

LG Electronics, "Considerations on UL ACK/NACK operation," 3GPP TSG RAN WG1#50bis, R1-074206, Shanghai, China, Oct. 8-12, 2007, pp. 1-4.

Motorola, "UL ACK/NACK for TDD," 3GPP TSG RAN1#52, R1-080738, Sorrento, Italy, Feb. 11-15, 2008, 5 pages.

* cited by examiner

US 8,531,997 B2

METHOD OF PERFORMING HYBRID AUTOMATIC REPEAT REQUEST (HARQ) IN WIRELESS COMMUNICATION SYSTEM

CROSS REFERENCE TO RELATED APPLICATIONS

This application is a Continuation of U.S. application Ser. No. 12/670,613, (now U.S. Pat. No. 7,957,329), filed on Jan. 25, 2010, which is a National Phase of PCT/KR2009/001270 filed on Mar. 13, 2009, which claims the benefit of U.S. Provisional Application Nos. 61/036,987 filed on Mar. 16, 2008, and 61/040,132 filed on Mar. 27, 2008. The entire contents of all of the above applications are hereby incorporated by reference.

TECHNICAL FIELD

This invention relates to wireless communication, and more specifically, to a method of performing HARQ in wireless communication system.

BACKGROUND ART

With the demand on a high-speed, large-volume data communication system for processing and transmitting a variety of information such as radio data as well as providing voice-oriented services, there is a need for developing a technique for transmitting large-volume data through the wireless communication network whose capacity is similar to that of the wired communication network. Therefore, an error handling method is essential for minimizing data loss and for increasing system transmission efficiency.

Examples of the error handling method include a forward error correction (FEC) scheme and an automatic repeat request (ARQ) scheme. In the FEC scheme, a receiver corrects an error by appending an extra error correction code to information bits. In the ARQ scheme, when a received signal has an error, a transmitter corrects the error by retransmitting data. A hybrid ARQ (HARQ) scheme is a combination of the FEC scheme and the ARQ scheme. According to the HARQ scheme, performance is enhanced by confirming whether data received by the physical layer contains an error that cannot be decoded and requesting retransmission if there is an error.

The HARQ operation is performed by at least one HARQ entity included in a user equipment (UE) or a base station (BS). The HARQ entity allows continuous data transmission while waiting for the feedback (i.e., the ACK signal or the NACK signal) on successful or unsuccessful reception of previous data transmission. In a downlink transmission, the UE receives resource assignment information from the BS, and the HARQ entity in the BS performs a HARQ process indicated by an HARQ information. To support the HARQ entity, the BS may operate a plurality of parallel HARQ processes.

Hereinafter, a downlink denotes a communication link from the BS to the UE, and an uplink denotes a communication link from the UE to the BS. The downlink transmission and the HARQ operation are performed in the following manner. The BS transmits downlink assignment to the UE through a physical downlink control channel (PDCCH). Then, according to the downlink assignment, the UE receives downlink data from the BS through a physical downlink shared channel (PDSCH). When the UE receives the downlink data from the BS, the UE transmits an ACK/NACK signal to the BS through a control channel (i.e., a physical uplink control channel (PUCCH)). If no error is detected in the received data, the ACK/NACK signal is an ACK signal. If an error is detected in the received data, the ACK/NACK signal is a NACK signal. When the BS receives NACK signal, the BS may retransmit the data to the UE. The downlink data here can be referred to as a codeword or a transport block.

Resources such as frequency, time, code and space, should be distinguished between downlink transmission and uplink transmission, and there needs to a scheme by which downlink resources and uplink resources are not overlapped. The scheme is called duplexing. The duplexing is classified into frequency division duplexing (FDD), in which the uplink and downlink are identified according to frequencies, and time division duplexing (TDD) in which the uplink and downlink are identified according to times.

In the FDD, frequencies having the same magnitude are symmetrically allocated in the uplink and downlink. The FDD has been widely used due to its structure suitable for symmetric services (e.g., voice calls). In recent years, however, researches on the TDD have actively been conducted due to its structure suitable for asymmetric services (e.g., Internet services). In the FDD, since the uplink and the downlink are identified in the frequency domain, seamless data transmission can be achieved between a base station (BS) and a user equipment (EU) in the time domain for each link.

The TDD is suitable for the asymmetric services since time slots each having a different ratio can be allocated for the uplink and downlink. In addition, a channel condition is almost constant in the uplink and downlink since data is transmitted and received in the same frequency band in the uplink and downlink. Therefore, the channel condition can be immediately estimated when a signal is received. Accordingly, the TDD is suitable for an array antenna technique.

In the TDD, an entire frequency band is used for uplink or downlink, and the uplink and downlink are identified in the time domain. Thus, the frequency band is used for the uplink for a certain period of time and is used for the downlink for the remaining periods of time, thereby disabling simultaneous data transmission/reception between the BS and the UE. If the uplink and downlink are alternately allocated with the same period of time, the BS does not have to inform whether a specific time point is used for uplink transmission or downlink transmission.

In FDD as well as in TDD, uplink resources are more limited than downlink resources. Because there are not enough uplink resources for uplink feedback on downlink data reception. For example, 4 resource blocks are used for downlink transmission and 1 resource block for uplink transmission respectively. If a UE receives data from a BS using the 4 resource blocks, the UE only have 1 resource block to use to transmit an ACK/NACK signal for the data reception. This lack of uplink resource makes HARQ more difficult because the BS should decide whether to transmit a new data or retransmit the old data with relatively small amount of uplink feedback information comparing with the downlink data.

A method of performing HARQ by effectively using limited uplink resource for uplink feedback is needed.

DISCLOSURE OF INVENTION

Technical Problem

It is an object of the present invention to provide a method of performing HARQ in wireless communication system. And the method of uplink ACK/NACK resource allocation related to the CCE index for downlink assignment in TDD mode as well as in FDD mode is also provided for the efficient utilization of uplink PUCCH resource and the commonality between FDD and TDD modes.

Technical Solution

According to an aspect of the present invention, a method of performing hybrid automatic repeat request (HARQ) performed by a user equipment (UE) in a wireless communication system is provided. The method includes receiving downlink assignments in a first subframe, a downlink assignment being transmitted based on a control channel element (CCE), the CCE being a logically indexed resource unit, receiving downlink data on a downlink shared channel in the first subframe, the downlink shared channel being assigned according to the downlink assignments, generating ACK/NACK signals which indicate successful or unsuccessful reception of the downlink data, and transmitting in a second subframe, the ACK/NACK signals by using uplink resources of a subset, the subset being mapped to the first subframe, at least one of the uplink resources being mapped to a plurality of CCEs in the first subframe.

According to another aspect of the present invention, a method of transmitting an ACK/NACK signal performed by a user equipment (UE) in a wireless communication system is provided. The method includes receiving downlink data in a first subframe according to a downlink assignment, the downlink assignment being carried by a CCE, the CCE being a logical resource unit, generating an ACK/NACK signal representing successful or unsuccessful reception of the downlink data, and transmitting the ACK/NACK signal by using an uplink resource in a second subframe, wherein the second subframe is associated with the first subframe for HARQ operation, and the uplilnk resource is mapped to a plurality of CCEs in the first subframe.

ADVANTAGEOUS EFFECTS

Amount of reserved ACK/NACK resources is semi-statically configurable. Limited resources for uplink feedback are effectively used to support HARQ operation.

MODE FOR THE INVENTION

Figure 1:
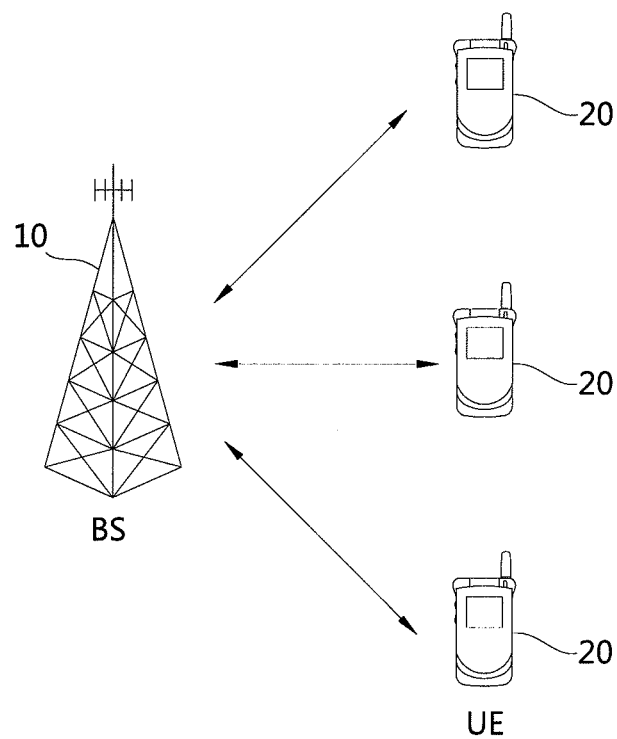
FIG. 1 shows a wireless communication system.

The present invention will now be described more fully with reference to the accompanying drawings, in which exemplary embodiments of the invention are shown. The invention may, however, be embodied in many different forms and should not be construed as being limited to the embodiments set forth herein. Rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements.

FIG. 1 shows a wireless communication system. The wireless communication system can be widely deployed to provide a variety of communication services, such as voices, packet data, etc.

Referring to FIG. 1, the wireless communication system includes a base station (BS) 10 and at least one user equipment (UE) 20. The BS 10 is generally a fixed station that communicates with the UE 20 and may be referred to as another terminology, such as a node-B, a base transceiver system (BTS), an access point, etc. There are one or more cells within the coverage of the BS 10. The UE 20 may be fixed or mobile, and may be referred to as another terminology, such as a mobile station (MS), a user terminal (UT), a subscriber station (SS), a wireless device, etc.

A downlink represents a communication link from the BS 10 to the UE 20, and an uplink represents a communication link from the UE 20 to the BS 10. In downlink, a transmitter may be a part of the BS 10, and a receiver may be a part of the UE 20. In uplink, the transmitter may be a part of the UE 20, and the receiver may be a part of the BS 10.

Different multiple access schemes may be used for downlink and uplink transmissions. For example, orthogonal frequency division multiple access (OFDMA) is used for downlink, and single carrier-frequency division multiple access (SC-FDMA) is used for uplink.

There is no limit in the multiple access scheme used in the wireless communication system. The multiple access scheme may be based on code division multiple access (CDMA), time division multiple access (TDMA), frequency division multiple access (FDMA), SC-FDMA, OFDMA, or other well-known modulation schemes. In these modulation schemes, signals received from multi-users are demodulated to increase capacity of the communication system.

The layers of the radio interface protocol can be classified into a first layer (L1), a second layer (L2), and a third layer (L3) based on the open system interconnection (OSI) model that is well-known in a communication system. Compared with the OSI model, a physical (PHY) layer corresponds to the first layer L1, the medium access control (MAC) layer and the radio link control (RLC) layer correspond to the second layer L2, and the radio resource control (RRC) layer corresponds to the third layer L3. The physical layer provides an information transfer service using a physical channel, the MAC layer is connected with physical layer through transport channel, and the radio RRC layer serves to control radio resources between the UE and the network.

Examples of a downlink transport channel include a broadcast channel (BCH) for transmitting system information and a downlink-shared channel (DL-SCH) for transmitting user traffic or control messages. The user traffic of downlink multicast or broadcast services or the control messages can be transmitted on the DL-SCH or an additional downlink multicast channel (DL-MCH). The downlink transport channel is mapped to a downlink physical channel. Examples of the downlink physical channel include a physical downlink shared channel (PDSCH) mapped to the DL-SCH, and a physical downlink control channel (PDCCH) for transmitting a control signal.

Examples of an uplink transport channel include a random access channel (RACH) for transmitting initial control messages and an uplink-shared channel (UL-SCH) for transmitting user traffic or control messages. The uplink transport channel is mapped to an physical uplink channel. Examples of the physical uplink channel include a physical random access channel (PRACH) mapped to the RACH, a physical uplink shared channel (PUSCH) mapped to the UL-SCH, and a physical uplink control channel (PUCCH) for uplink control messages. The PUSCH is a physical uplink shared channel, and is used when the UE transmits data in uplink.

The PDCCH is a downlink physical control channel and transmits control information for the PUSCH or the PDSCH. An uplink grant that is scheduling information for uplink data transmission and a downlink grant that is scheduling information for downlink data transmission can be transmitted through the PDCCH. Herein, the scheduling information implies control information including radio resource assignment for transmitting downlink data from the BS to the UE or for receiving uplink data from the UE, a modulation and coding scheme (MCS), MIMO information, etc.

Figure 2:
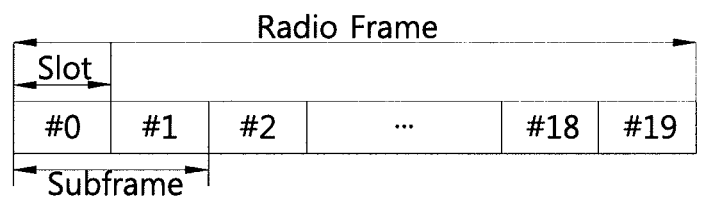
FIG. 2 shows an exemplary structure of a radio frame.

FIG. 2 shows an exemplary structure of a radio frame.

Referring to FIG. 2, the radio frame includes 10 subframes. One subframe includes two slots. The subframe is a basic unit of data transmission. Downlink or uplink scheduling is performed in a subframe unit when the radio frame is used in a TDD system. One slot may include a plurality of OFDM symbols in a time domain and at least one subcarrier in a frequency domain. One slot may include 7 or 6 OFDM symbols.

The radio frame structure is shown for exemplary purposes only. Thus, the number of subframes included in the radio frame, the number of slots included in the subframe, and the number of OFDM symbols and subcarriers included in the slot can change variously.

Figure 3:
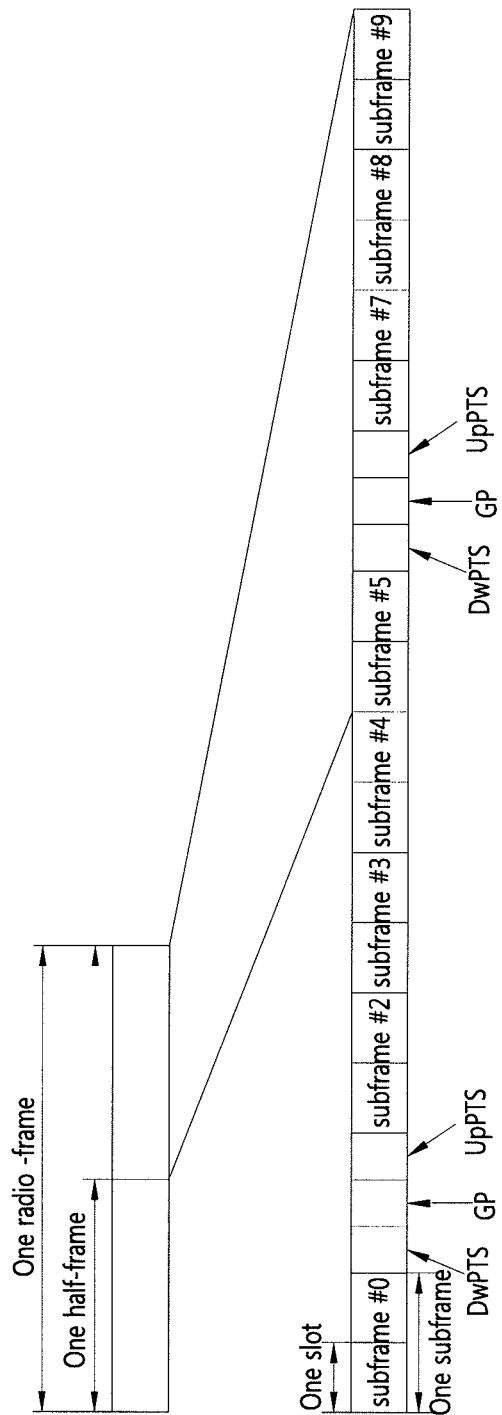
FIG. 3 shows another exemplary structure of a radio frame.

FIG. 3 shows another exemplary structure of a radio frame.

Referring to FIG. 3, the radio frame includes two half-frames. Each half-frame has the same structure. Specifically, each half-frame includes 5 subframes and 3 fields, i.e., a downlink pilot time slot (DwPTS), a guard period (GP), and an uplink pilot time slot (UpPTS). The DwPTS is used for initial cell search, synchronization, or channel estimation in a UE. The UpPTS is used for channel estimation in a BS and uplink transmission synchronization of the UE. The GP is used to remove interference that occurs in uplink due to a multi-path delay of a downlink signal between uplink and downlink.

Figure 4:
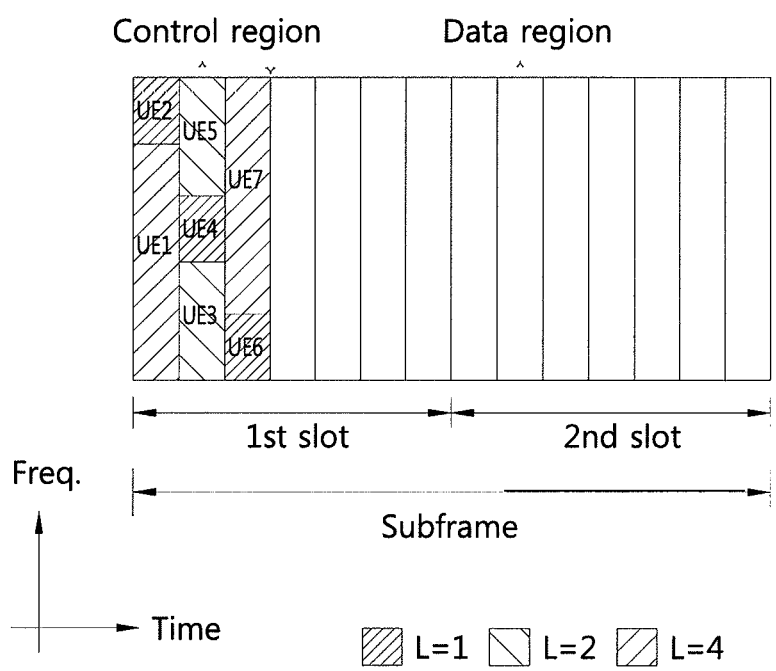
FIG. 4 shows an exemplary structure of a downlink subframe.

FIG. 4 shows an exemplary structure of a downlink subframe.

Referring to FIG. 4, the first three OFDM symbols in the downlink subframe are allocated to control region which is used for PDCCH. The rest of the symbols in the downlink subframe are allocated to data region for PDSCH. In the control region, other control channels such as physical control format indicator channel (PCFICH), physical HARQ indicator channel (PHICH) are also allocated apart from PDCCH. The number of OFDM symbols in control region in a downlink subframe can be indicated by PCFICH. A UE reads control information on PDCCH and reads data on PDSCH by means of the control information. The number of OFDM symbols for PDCCH are given just as an exemplary purpose only.

The control region is composed of a plurality of control channel elements (CCEs), that is in a logical queue. Hereinafter CCEs is a logically indexed resource unit to carry a control channel (i.e. PDCCH). CCE corresponds to a group containing a plurality of physical resource elements. For example, CCE can corresponds to a group containing 9-physical resource element groups. The physical resource element group is used to define mapping control channel to a physical resource element.

A plurality of PDCCHs can be transmitted in the control region. Each PDCCH carries control information, (i.e. downlink assignment). PDCCH is transmitted on a CCE basis or on consecutive CCEs aggregation basis. The format and the available bit numbers of PDCCH is determined based on the number of CCEs in the consecutive CCEs aggregation. Hereinafter, the number of CCEs used for PDCCH transmission is defined as CCE aggregation level. The CCE aggregation level is a unit based on which a UE monitors PDCCH. The size of the CCE aggregation level is defined by the number of contiguous CCEs. For instance, the CCE aggregation level can be one of a set $\{1, 2, 4, 8\}$.

Table 1 below shows an example of PDCCH format, available number of bits for PDCCH according to the CCE aggregation level.

TABLE 1

| PDCCH format | CCE aggregation level | Number of resource element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

The CCE aggregation level can be different from UE to UE. For example, the CCE aggregation level (L) is 1 for UE 2, UE and UE 6. The CCE aggregation level (L) is 2 for UE 3 and UE 5. The CCE aggregation level (L) is 4 for UE 1 and UE 7.

The control information on PDCCH is called downlink control information (DCI). DCI contains uplink scheduling information, downlink scheduling information, uplink power control command, paging control information, and indicator for RACH response, etc. DCI format 0 is for PUSCH scheduling, DCI format 1 is for PDSCH codeword scheduling, DCI format 1A is for compact PDSCH codeword scheduling, DCI format 1C is for very simple scheduling of DL-SCH, DCI format 2 is for PDSCH scheduling in closed-loop spatial multiplexing mode, DCI format 2A is for PDSCH scheduling in open-loop spatial multiplexing mode, and DCI format 3 and 3A is for transmission power control for uplink channel.

Figure 5:
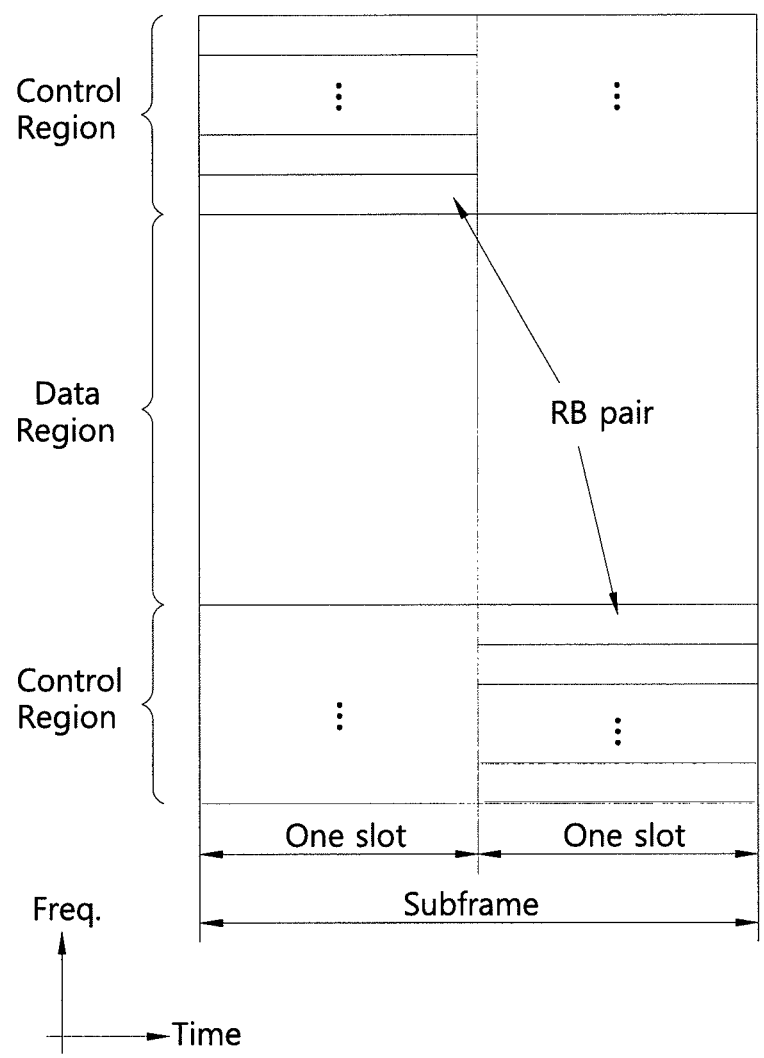
FIG. 5 shows an exemplary structure of an uplink subframe.

FIG. 5 shows an exemplary structure of an uplink subframe.

Referring to FIG. 5, uplink subframe is divided into a control region and a data region. The control region includes PUCCH and the data region includes PUSCH. One UE does not transmit PUCCH and PUSCH simultaneously to hold a single carrier property when SC-FDMA is applied.

PUCCH is assigned to one UE in a subframe as a RB pair. And RBs in the RB pair occupy different subcarriers in each of the slots. This is referred to as a frequency hopping of a RB pair in a slot boundary.

PUCCH supports multiple formats. That is, uplink control information, which has different bit numbers per subframe according to modulation scheme, can be transmitted on PUCCH.

The following table represents PUCCH format, modulation scheme and bit numbers supported by 3GPP TS 36.211 V8.2.0.

TABLE 2

| PUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

PUCCH format 1 is used to transmit scheduling request (SR), PUCCH format 1a/1b is used to transmit an ACK/NACK signal, PUCCH format 2 is used to transmit channel quality information (CQI), and PUCCH format 2a/2b is used to transmit CQI and an ACK/NACK signal.

In an arbitrary subframe, PUCCH format 1a/1b is used when an ACK/NACK signal is transmitted alone, whereas PUCCH format 1 is used when SR is transmitted alone. If an ACK/NACK signal and SR are transmitted simultaneously, an SR resource assigned for positive SR transmission is used to transmit an ACK/NACK signal, and an ACK/NACK resource assigned for ACK/NACK signal is used to transmit an ACK/NACK signal ans a negative SR.

Table 3 shows an example of downlink/uplink configurations of the radio frame in TDD system. The configuration of the radio frame indicates a specific rule according to which all subframes are allocated (or reserved) for uplink or downlink.

TABLE 3

| Con-figuration | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 3, 'D' denotes a subframe used for downlink transmission, and 'U' denotes a subframe used for uplink transmission. Further, 'S' denotes a special subframe that is used for a special purpose, such as, frame synchronization or downlink transmission. Hereinafter, a subframe used for downlink transmission is simply referred to as a downlink subframe, and a subframe used for uplink transmission is simply referred to as an uplink subframe. For each configuration, a position and the number of downlink and uplink subframes are different from each other within one radio frame.

A time point at which downlink is switched to uplink, or vice versa, is defined as a switching point. A switch-point periodicity represents a period in which the same switching pattern is repeated between uplink and downlink. The switch-pint periodicity is 5 ms or 10 ms. For example, in case of the configuration 1, switching occurs in the pattern of D->S->U->U->U from 0th to 4th subframes. In addition, from 5th to 9th subframes, switching occurs in the pattern of D->S->U->U->U in the same pattern as the previous switching. Since one subframe is 1 ms, the switch-point periodicity is 5 ms. That is, the switch-point periodicity is less than one radio frame length (i.e., 10 ms), and switching is repeated one time within the radio frame.

For all configurations, 0th and 5th subframes and the DwPTS are used for downlink transmission. A 1st subframe in all configurations and a 6th subframe in configurations 0, 1, 2, and 6 are composed of the DwPTS, the GP, and the UpPTS. A time length of each field varies depending on configurations. The remaining 8 subframes other than the 1st and 6th subframes are composed of 2 slots.

If the switch-point periodicity is 5 ms, the UpPTS and 2nd and 7th subframes are reserved for uplink transmission. If the switch-point periodicity is 10 ms, the UpPTS and the 2nd subframe are reserved for uplink transmission, and the DwPTS, and 7th and 9th subframes are reserved for downlink transmission.

The configuration in table 3 may be system information known by both the BS and the UE. The BS can inform the UE that an uplink-downlink allocation state of the radio frame is modified by transmitting only a configuration index whenever the configuration of the radio frame changes. The configuration is a sort of downlink control information. Similarly to other scheduling information, the configuration may be transmitted on a physical downlink control channel (PDCCH). Alternatively, the configuration may be control information commonly transmitted on a broadcast channel to all UEs existing in a cell. In addition, the configuration may be included in the system information. The number of half-frames included in the radio frame, the number of subframe included in the half-frame, and the combination of the downlink subframe and the uplink subframe in the TDD system are shown for exemplary purposes only.

When it comes to HARQ operation, a UE receives downlink data in a downlink subframe and transmits an ACK/NACK signal as a feedback in an uplink subframe. This causes a problem especially when there are more downlink subframes than uplink subframes in a radio frame. In table 3 above, let 'S' indicate a downlink subframe. In case of configuration 2, a radio frame includes 8 downlink subframes and 2 uplink subframes. That is, the radio of downlink subframe to uplink subframe is 4:1. In this case, a UE receives data throughout 4 downlink subframes and feeds back ACK/NACK signals in a single uplink subframe for HARQ operation. When the number of downlink subframes are larger than that of uplink subframes, radio resources used to transmit ACK/NACK signals are insufficient.

So the linkage of downlink subframe and uplink subframe for uplink ACK/NACK feedback needs to be defined for each downlink/uplink configuration in table 3, where one uplink subframe may carry ACK/NACK signals for multiple downlink subframes depending on the downlink/uplink configuration. A predefined relationship among downlink subframe(s) and uplink subframe(s) in order to avoid an excessive uplink ACK/NACK resource reservation is described hereinafter. The amount of reserved ACK/NACK resources should be semi-statically configurable so that the number of ACK/NACK resources can be set less than the number of CCEs in a corresponding downlink subframe.

Semi-static DL/UL linkage in the configurations in table 3 according to the present invention is described in table 4 below.

TABLE 4

| i-1 configuration 9 | subframe number in radio frame i | | | | | | | | | | subframe number in radio frame i + 1 | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| 0 | U | D | D | U | U | U | D1 | D2 | U | U | U | D3 | D4 | U1 | U2 | U | D | D | U3 | U4 | U |
| 1 | D | D | D | U | U | D | D1 | D1 | U | U | D2 | D3 | D3 | U1 | U2 | D4 | D | D | U3 | U4 | D |
| 2 | D | D | D | U | D | D1 | D1 | D1 | U | D1 | D2 | D2 | D2 | U1 | D2 | D | D | D | U2 | D | D |
| 3 | D | D | D1 | U | U | D1 | D2 | D2 | D3 | D3 | D3 | D | U1 | U2 | U3 | D | D | D | D | D | D |
| 4 | D | D1 | D1 | U | U | D1 | D1 | D2 | D2 | D2 | D2 | D | D | U1 | U2 | D | D | D | D | D | D |
| 5 | D1 | D1 | D1 | U | D1 | D1 | D1 | D1 | D1 | D1 | D | D | D | U1 | D | D | D | D | D | D | D |
| 6 | D | D | D | U | U | U | D1 | D2 | U | U | D3 | D4 | D5 | U1 | U2 | U3 | D | D | U4 | U5 | D |

In table 4, special downlink subframes (indicated by 'S' in table 3) are used for downlink subframe, and indicated by 'D' to avoid confusions. An ACK/NACK signal corresponding to downlink subframe D#n is transmitted in uplink subframe U#n. For example, a downlink subframe D1 in radio frame i corresponds to an uplink subframe U1 in radio frame (i+1). Even though there are some subframes with no #n attached (D and U), those subframes are also linked to other subframes for ACK/NACK signal feedback.

In most configurations, all or some uplink subframes are linked to multiple downlink subframes. In other word, one uplink subframe is associated with at least one downlink subframe. In configuration 0, there are 4 one downlink subframe-to-one uplink subframe correspondence, and 2 uplink subframes are not linked to any downlink subframe. In configuration 1, there are 2 two downlink subframes-to-one uplink subframe correspondence, and 2 one downlink subframe-to-one uplink subframe correspondence. In configuration 2, there are 2 four downlink subframe-to-one uplink subframe correspondence. In configuration 3, there are 2 two downlink subframe-to-one uplink subframe correspondence, and 1 three downlink subframes-to-one uplink subframe correspondence. In other configurations, it is easily assumed the correspondence relationship between downlink subframe and uplink subframe.

Hereinafter, uplink radio resource which is used to transmit an ACK/NACK signal is called an ACK/NACK resource. The ACK/NACK resource can be combinations of resource block, cyclic shift and orthogonal cover. The ACK/NACK resource is assigned according to an uplink scheduling information, such as uplink grant. A subset which includes at least one ACK/NACK resource is called an ACK/NACK resource subset. An uplink subframe can contain a plurality of ACK/NACK resource subsets. The number of ACK/NACK resources in each of the ACK/NACK resource subsets can be various.

In configuration 0, 1 and 3 respectively, two different downlink to uplink subframe correspondences for ACK/NACK feedback exist in a radio frame. In these cases, amount of the ACK/NACK resources in an ACK/NACK resource subset may be adjusted depending on the uplink subframe to have the same amount of ACK/NACK resources for all the uplink subframes. Or else, the amount of ACK/NACK resource in all ACK/NACK resource subsets may be kept similar or same so that the amount of ACK/NACK resource varies depending on the uplink subframe.

The correspondence between downlink subframe(s) and uplink subframe(s) for an ACK/NACK signal feedback in each configuration of a radio frame is described above. From now on, the method of making ACK/NACK resource subsets in an uplink subframe is described. The method is about grouping or dividing ACK/NACK resources efficiently in a situation where there are not enough ACK/NACK resources to deal with all downlink data in HARQ operation. The method is applied to a FDD system as well as a TDD system.

Figure 6:
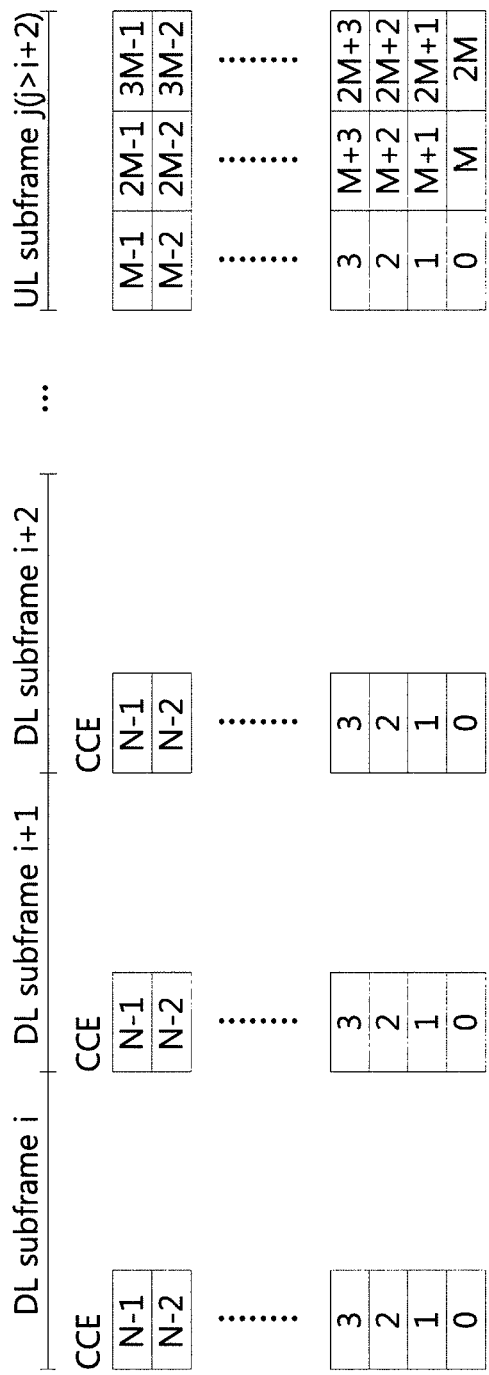
FIG. 6 illustrates ACK/NACK resources grouping method according to an embodiment of the present invention.

FIG. 6 illustrates ACK/NACK resources grouping method according to an embodiment of the present invention.

Referring to FIG. 6, three downlink subframes-to-one uplink subframe correspondence is used in a radio frame configuration for HARQ operation. The three downlink subframes are indexed as i, and (i+2) respectively and the one uplink subframe is indexed as j(j>i-E2). This means that the jth uplink subframe should carry ACK/NACK signals corresponding to the three downlink subframes. So the ACK/NACK resources are divided into three ACK/NACK resource subsets where each subset carries ACK/NACK signals corresponding to one of the three downlink subframes exclusively.

To generalize this, ACK/NACK resources in an uplink subframe are divided into L subsets when L downlink subframes are linked to that uplink subframe for an ACK/NACK feedback. That means the number of ACK/NACK resource subsets in an uplink subframe is determined according to the number of downlink subframes linked with the uplink subframe.

Each subset contains same or different amount of ACK/NACK resources. For convenience, let's assume each subset contains same number of ACK/NACK resources, M, so that the uplink subframe contains L×M ACK/NACK resources in total. The ACK/NACK resource subset 1, 2, ..., L include ACK/NACK resource 0 to M−1, M to 2M−1. and (L−1)×M to (L×M)−1 respectively.

Then, M ACK/NACK resources in each subset are mapped to N CCEs in one of the L downlink subframes exclusively. CCEs in downlink subframe i are mapped to ACK/NACK resource 0 to M−1, CCEs in downlink subframe (i+1) are mapped to ACK/NACK resource M to 2M−1, and CCEs in downlink subframe (i+2) are mapped to ACK/NACK resource 2M to 3M−1. The number of CCEs in each of the downlink subframes can be the same for each other or different from each other. M can be configured as a value equal to or smaller than N. Here, N value should be maximum number of CCEs in a downlink subframe since actual number of CCEs can vary dynamically downlink subframe by subframe.

In summary, when an uplink subframe carries ACK/NACK signals for multiple downlink subframes, ACK/NACK resources are divided into multiple subsets so that ACK/NACK resources of each subset are linked to one downlink subframe exclusively.

The method of dividing ACK/NACK resource into a plurality of subsets is given by a math figure below.

MathFigure 1

$$N_{CCE}^G = \sum_{j=0}^{N_g-1} N_{CCE}(j) \quad \text{[Math. 1]}$$

Where a CCE group consists of CCEs in a single subframe and $N_{CCE}(j)$ is the number of (Maximum) CCEs for jth CCE group. $N_{CCE}(j)$ should be replaced by $N_{CCE}$ if the number of (maximum) CCEs for all subframes is set equal. $N_g$ is the number of CCE groups in the PUCCH. $N^G_{CCE}$ is equal to $N_g \times N_{CCE}$ if the number of (maximum) CCEs for all subframes is set equal.

Hereinafter, a method of mapping between ACK/NACK resource and CCE is described. ACK/NACK resources in a subset can be remapped to different CCEs so that number of ACK/NACK resources in a subset can be smaller than number of CCEs in a downlink subframe. As a result, amount of reserved ACK/NACK resources is semi-statically configurable. This configurability and remapping approach can be applied to FDD mode as well.

Figure 7:
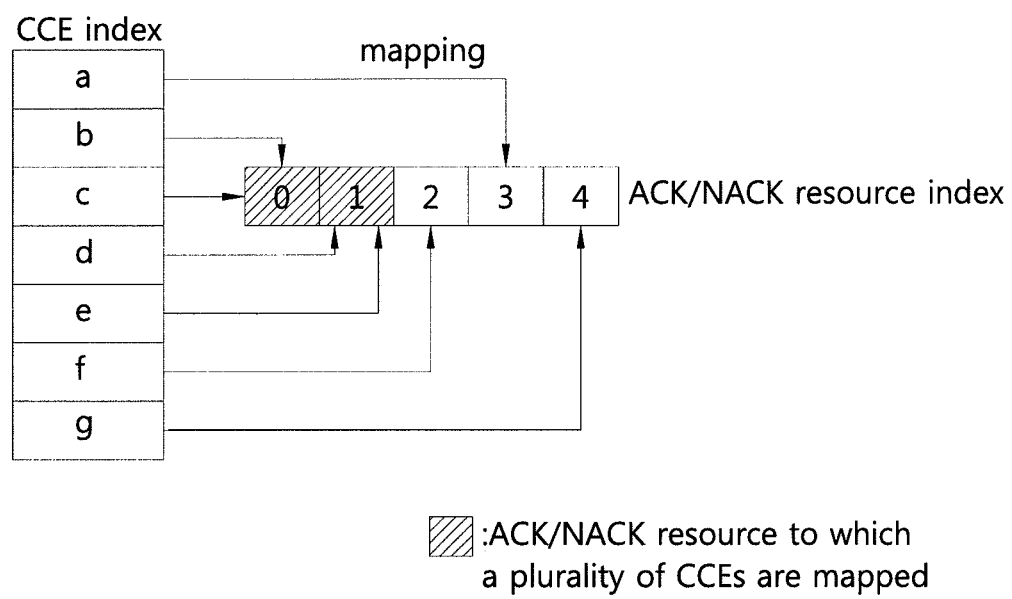
FIG. 7 illustrates CCE to ACK/NACK resource mapping method according to an embodiment of the present invention.

FIG. 7 illustrates CCE to ACK/NACK resource mapping method according to an embodiment of the present invention. It is assumed that M ACK/NACK resources in a subset are indexed from 0 to M−1 and N CCEs in a downlink subframe are indexed from 0 to N−1 where order of CCE index can be virtually interleaved within each PUCCH resource block (RB).

Referring to FIG. 7, there are 7 CCEs (CCE index 'a' through 'g') for PDCCH and only 5 ACK/NACK resources (index 0 through 4) are used to transmit ACK/NACK signals corresponding to PDCCH. Because N>M, the same ACK/NACK resource is remapped to CCE. In other words, a plurality of CCEs are mapped to an ACK/NACK resource. CCEs 'b' and 'c' are mapped to ACK/NACK resource 0, CCEs 'd' and 'e' are mapped ACK/NACK resource 1. But, CCEs 'a', 'f', and 'g' are mapped exclusively to individual ACK/NACK resource 3, 2, 4 respectively.

Repeated ACK/NACK index to CCE index mapping causes restriction in PDCCH scheduling since a BS should consider a same ACK/NACK resource is not linked to multiple PDSCH transmissions in a downlink subframe. However, this is the cost for reducing the required amount uplink ACK/NACK resources. In general, this ACK/NACK index to multiple CCE index mapping can be allowed when L=1 as well. That is, when an uplink subframe corresponds to a single downlink subframe. Because there seems to be no reason to forbid the same mapping scheme to be applied. Furthermore, this mapping scheme can be also applied to FDD mode for efficient PUCCH resource utilization and commonality between FDD and TDD.

Figure 8:
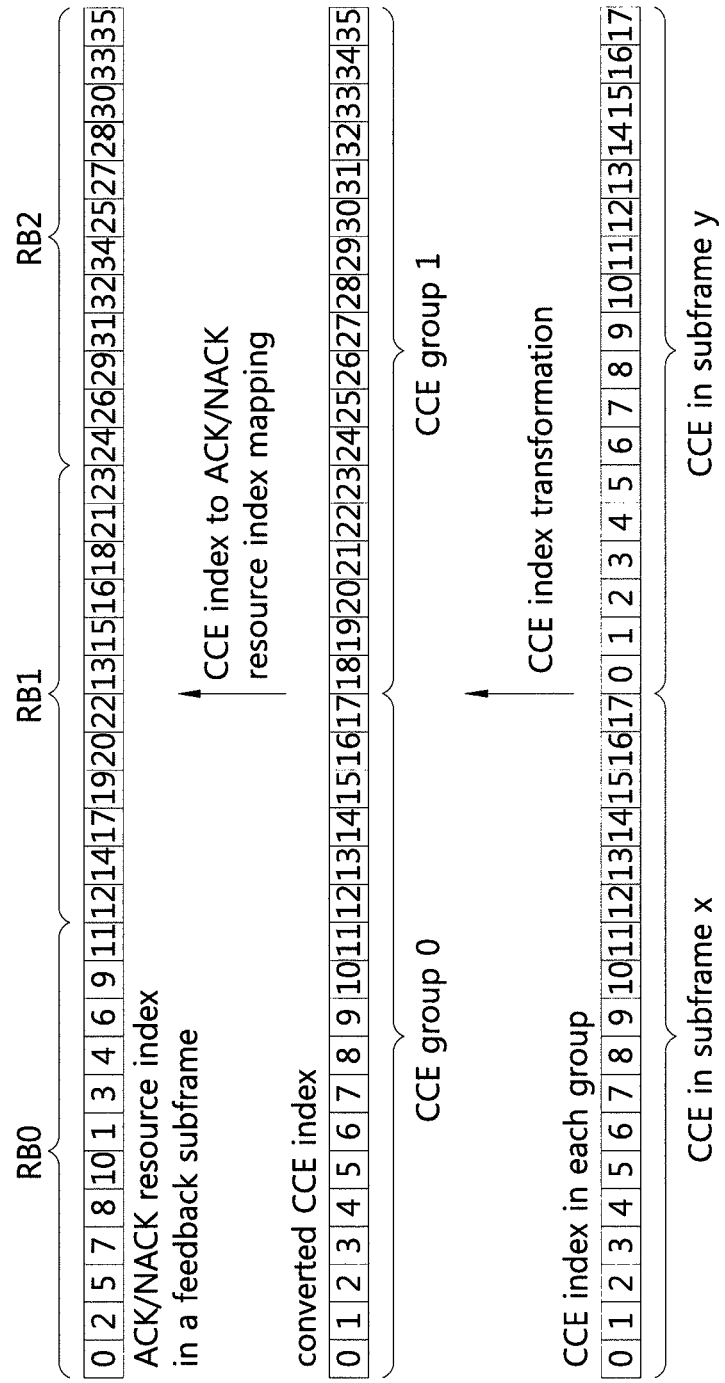
FIG. 8 illustrates CCE to ACK/NACK resource mapping method according to another embodiment of the present invention.

FIG. 8 illustrates CCE to ACK/NACK resource mapping method according to another embodiment of the present invention. It is assumed that extended CP, 3 RBs for ACK/NACK signal, 12 ACK/NACK resources per RB and 18 CCEs per downlink subframe are used.

Referring to FIG. 8, CCEs in subframe x are indexed 0 through 17 and CCEs in subframe y are indexed 0 through 17. When a UE receives CCEs in the subframe x and y, the US converts the indices of the CCEs in the subframe y. As a result, the indices of the CCEs in the subframe y are converted into 18 through 35. The indices of the CCEs in the subframe x remains the same. And all the CCEs over the subframe x and y are indexed 0 through 35. In such a manner, CCE indexes of multiple downlink subframes become consecutive. Then, the converted CCE indexes can be mapped to ACK/NACK indexes straightforwardly or in a per-RB interleaved way.

When the number of ACK/NACK resources in a subset is smaller than the number of CCEs in a downlink subframe corresponding to the subset, some ACK/NACK resources needs to be remapped to ACK/NACK resources. In this case, ACK/NACK resources in the subset is remapped only to the CCEs in the corresponding downlink subframe. This remapping can be done by converting CCE indexes within a certain range which is mapped to an ACK/NACK resource subset in a downlink subframe. Therefore, different CCEs in a downlink subframe is assigned a same converted CCE indexes.

Figure 9:
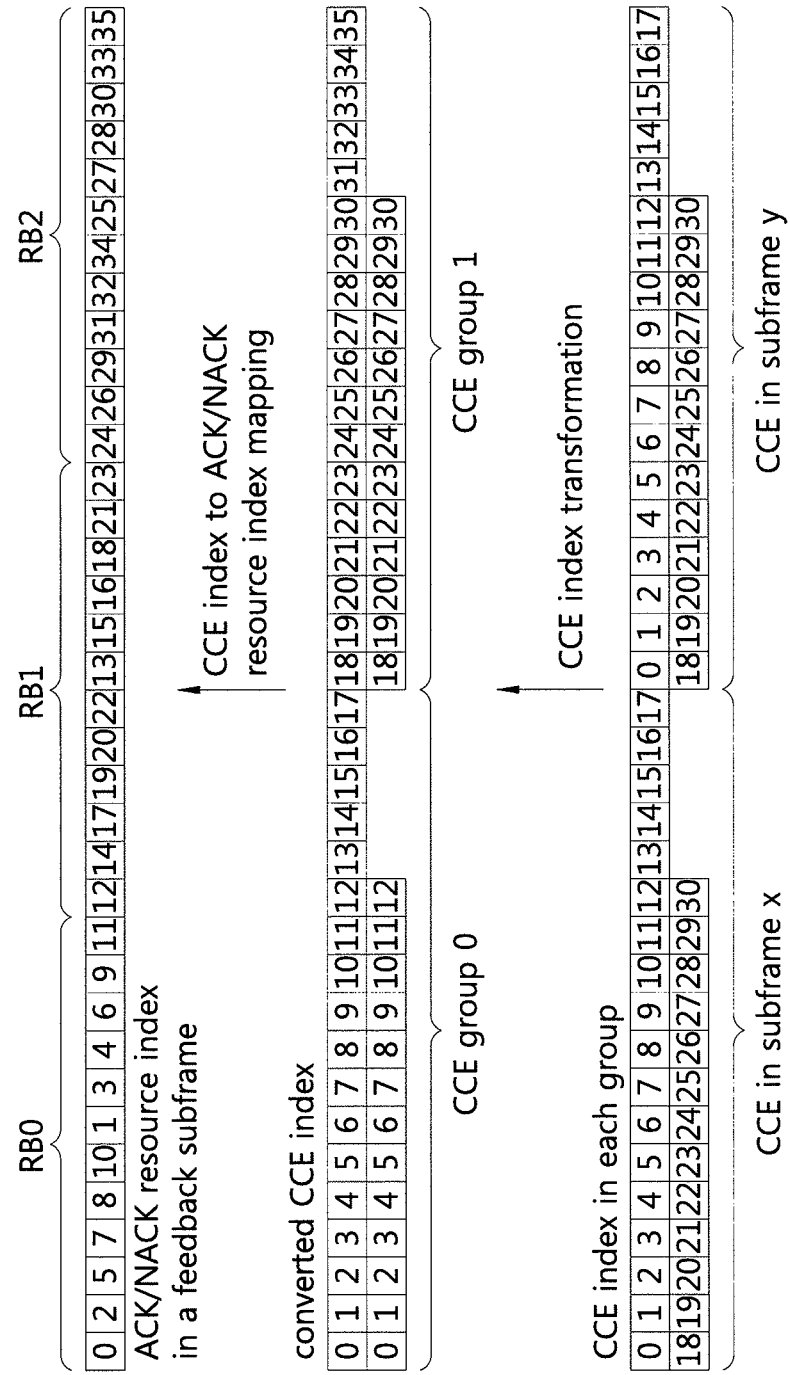
FIG. 9 illustrates CCE to ACK/NACK resource mapping method according to yet another embodiment of the present invention.

FIG. 9 illustrates CCE to ACK/NACK resource mapping method according to yet another embodiment of the present invention. It is assumed that extended CP, 3 RBs for ACK/NACK, 12 ACK/NACK resources per RB and 31 CCEs per downlink subframe are used.

Referring to FIG. 9, subframe x and y are mapped to a feedback subframe having ACK/NACK resources for the subframe x and y. The feedback subframe is used to transmit ACK/NACK signals corresponding to the subframe x and y. The ACK/NACK resources in the feedback subframe are divided into 2 subsets, because there are 2 subframes linked to the feedback subframe.

Subset 1, which has ACK/NACK resource indices 0 through 17, is mapped to the subframe x. And subset 2, which has ACK/NACK resource indices 18 through 35, is mapped to the subframe y.

The number of CCEs in each subframe is larger than that of ACK/NACK resources in corresponding subset. Some ACK/NACK resources in subset 1 are to be remapped to CCEs with indices 18 through 30 in the subframe x. And some ACK/NACK resources in subset 2 are to be remapped to CCEs with indices 0 through 12 in the subframe y.

Before remapping of ACK/NACK resources and CCEs, the indices of the extra CCEs are converted into other indices. These CCEs whose indices are converted for remapping are called extra CCEs, and the CCEs whose indices are not converted are called regular CCEs hereinafter. For example, the indices of the extra CCEs 18 through 30 in the subframe x are converted into 0 through 12, which already exists. And the indices of the extra CCEs 0 through 17 in the subframe y are converted into 18 through 35.

Then, the converted indices of extra CCEs 0 through 12 are duplicated with the indices of regular CCEs in the subframe x. And the the converted indices of extra CCEs 18 through 30 are duplicated with the indices of regular CCEs in the subframe y.

ACK/NACK resources with indices 0 through 12 in the subset 1 are mapped to the extra CCEs with converted indices and to the regular CCEs with indices 0 through 12. That is, the remapping takes place. But ACK/NACK resources with indices 13 through 17 in the subset 1 are mapped only to the regular CCEs with indices 13 through 17.

The same remapping procedure is applied to the subframe y and the subset 2.

Figure 10:
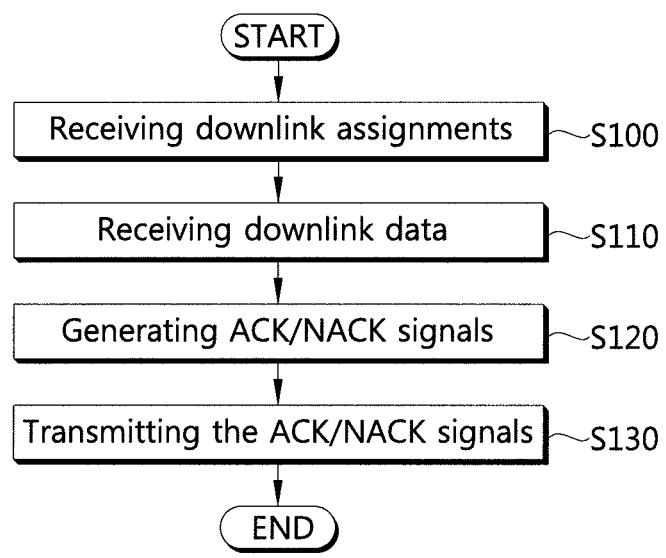
FIG. 10 is a flow diagram illustrating ACK/NACK signal transmission according to an embodiment of the present invention.

FIG. 10 is a flow diagram illustrating ACK/NACK signal transmission according to an embodiment of the present invention.

Referring to FIG. 10, receiving downlink assignments (S100). The downlink assignments can be referred to as downlink scheduling information or downlink grant. The downlink assignments are received in a first subframe, which contains downlink data. The downlink assignment is transmitted based on a control channel element (CCE). The CCE is a logically indexed resource unit for control region of the first subframe. The downlink assignment is transmitted on a downlink control channel which is PDCCH. The first subframe can be a downlink subframe or a plurality of downlink subframes in TDD system.

Receiving downlink data on a downlink shared channel in the first subframe (S110). The downlink shared channel is assigned according to the downlink assignments. The downlink shared channel is PDSCH.

Generating ACK/NACK signals (S120). The ACK/NACK signals indicate successful or unsuccessful reception of the downlink data.

Transmitting in a second subframe, the ACK/NACK signals or a representative ACK/NACK signal by using uplink resources (which is mapped to the CCEs carrying the downlink assignment) by using uplink resources of a subset (S130). The subset is mapped to the first subframe, and at least one of the uplink resources is mapped to a plurality of CCEs in the first subframe. The second subframe can be an uplink subframe in TDD system.

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of determining a radio resource for hybrid automatic repeat request (HARQ) in a time-division-duplex (TDD) communication system, performed by a user equipment, the method comprising:
receiving a first downlink assignment on a first physical downlink control channel (PDCCH) in a first downlink subframe;
receiving a second downlink assignment on a second PDCCH in a second downlink subframe;
receiving first downlink data in the first downlink subframe using a radio resource identified by the first downlink assignment;
receiving second downlink data in the second downlink subframe using a radio resource identified by the second downlink assignment; and
determining an ACK/NACK resource for the first downlink data and the second downlink data in an uplink subframe,
wherein the ACK/NACK resource is determined based on a number of linked downlink subframes associated with the uplink subframe and a control channel element (CCE) used for at least one of the linked downlink subframes, the linked downlink subframes including the first downlink subframe and the second downlink subframe,
wherein the ACK/NACK resource is determined for an ACK/NACK signal, and
wherein the ACK/NACK signal is not transmitted when at least one of the first downlink assignment and the second downlink assignment is determined to be missed.

2. The method of claim 1, wherein the ACK/NACK signal is transmitted when the first downlink assignment and the second downlink assignment are successfully received.

3. The method of claim 1, wherein the ACK/NACK resource is used for an ACK/NACK signal to be transmitted on a physical uplink control channel (PUCCH).

4. The method of claim 1, further comprising:
transmitting an ACK/NACK signal for the first downlink data and the second downlink data using the ACK/NACK resource.

5. The method of claim 1, wherein the linked downlink subframes associated with the uplink subframe are predefined.

6. A user equipment of determining a radio resource for hybrid automatic repeat request (HARQ) in a time-division-duplex (TDD) communication system, the user equipment comprising:
a transceiver including a processor, the processor configured for:
receiving a first downlink assignment on a first physical downlink control channel (PDCCH) in a first downlink subframe;
receiving a second downlink assignment on a second PDCCH in a second downlink subframe;
receiving first downlink data in the first downlink subframe using a radio resource identified by the first downlink assignment;
receiving second downlink data in the second downlink subframe using a radio resource identified by the second downlink assignment; and
determining an ACK/NACK resource for the first downlink data and the second downlink data in an uplink subframe,
wherein the ACK/NACK resource is determined based on a number of linked downlink subframes associated with the uplink subframe and a control channel element (CCE) used for at least one of the linked downlink subframes, the linked downlink subframes including the first downlink subframe and the second downlink subframe,
wherein the ACK/NACK resource is determined for an ACK/NACK signal, and
wherein the ACK/NACK signal is not transmitted when at least one of the first downlink assignment and the second downlink assignment is determined to be missed.

7. The user equipment of claim 6, wherein the ACK/NACK signal is transmitted when the first downlink assignment and the second downlink assignment are successfully received.

8. The user equipment of claim 6, wherein the ACK/NACK resource is used for an ACK/NACK signal to be transmitted on a physical uplink control channel (PUCCH).

9. The user equipment of claim 6, wherein the processor is further configured for transmitting an ACK/NACK signal for the first downlink data and the second downlink data using the ACK/NACK resource.

10. The user equipment of claim 6, wherein the linked downlink subframes associated with the uplink subframe are predefined.

* * * * *